July 26, 1955
F. C. ARMISTEAD
2,714,169
GAMMA RAY MEASURING
Filed Dec. 22, 1951
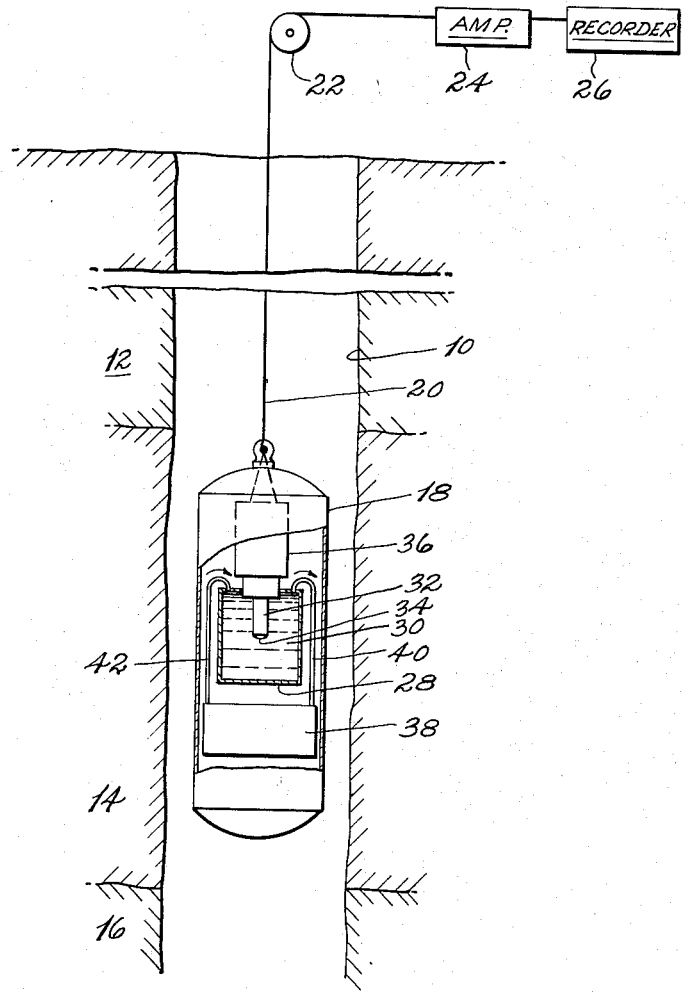
INVENTOR.
FONTAINE C. ARMISTEAD
BY
ATTORNEYS

United States Patent Office 2,714,169
Patented July 26, 1955

2,714,169

GAMMA RAY MEASURING

Fontaine C. Armistead, Marblehead, Mass., assignor to Texaco Development Corporation, New York, N. Y., a corporation of Delaware Application December 22, 1951, Serial No. 262,922

12 Claims. (Cl. 250—71)

This invention relates to the measuring of penetrative radiation such as gamma rays and, more particularly, to the measuring of gamma rays from earth formations such as those entering a well or bore hole from the earth formations traversed thereby. The principal object of the invention is the provision of a method and apparatus of the scintillometer type in which certain elements of the scintillometer are cooled by a fluid medium which also serves as a luminophor.

As is well known, a scintillometer comprises essentially a luminophor which may be a crystal of a substance such, for example, as sodium iodide, thallium activated, and a photosensitive device such as a photo-multiplier tube disposed in proximity to the luminophor so that gamma rays penetrating the luminophor will produce photons therein which are detected and amplified in the photo-multiplier tube to produce electrical pulses corresponding in number to the gamma rays or other radiation causing the scintillations. A photo-cathode tube of the kind known as type 5819 is frequently used, and it is known that these tubes and most of the other commercial photo-multiplier tubes are limited in use to an ambient temperature of about 75° C. since temperatures exceeding this value tend to destroy the surface of the tube. Thus, where scintillometers of the type described are to be subjected to temperatures higher than 75° C., it is usually necessary to refrigerate or cool the photo tube so that its temperature will not exceed that amount. This is generally true when scintillometers are used to measure or detect radiation from formations traversed by a well or bore hole, i. e., in the making of a radioactivity log of the hole. Suggestions have been made for packing the scintillometer in a cold medium such as Dry Ice or ordinary ice, but this requires that some considerable attention be given the instrument before the radiation measurements are to be taken.

In accordance with this invention, a scintillometer is used having a luminophor and a photo-sensitive device subjected to the photons produced in the luminophor, but instead of a solid luminophor crystal, a liquid luminophor is used and this luminophor is cooled and circulated in proximity to the photo-sensitive device so that it serves also as a coolant or a cooling medium for the temperature sensitive element of the scintillometer.

For a better understanding of the invention, reference may be had to the accompanying drawing in which the single figure is a vertical elevation through a portion of a bore hole in which an instrument embodying the invention is shown as suspended.

Referring to the drawing, a bore hole 10 is shown as traversing several sub-surface formations, such as those indicated at 12, 14 and 16, and it is understood that the bore hole may or may not be provided with a casing, since it is well known that radiation such as gamma rays from the formations will pass through the conventional well casing with but very little loss. Shown suspended within the bore hole is a logging instrument indicated generally by the closed housing 18, this housing being attached to one end of a conductor cable 20 extending to the surface. At the surface, the cable 20 passes over a suitable cable measuring reel or drum 22 and from there to an amplifier 24 and a recorder 26 which may be of the moving tape or film strip type. As is well known, the logging instrument 18 is adapted to be lowered and raised through the bore hole by means of the cable 20 and the position of the instrument in the hole is measured by the device 22.

Disposed within the housing 18 is a receptacle 28 adapted to contain a liquid luminophor 30. Projecting into the luminophor is a photo-sensitive device such as a photo-multiplier tube 32 having a cathode 34. The tube 32 is connected to a preamplifier 36, the output of which passes to the lower end of the cable 20, and from there to the surface. Radiation such, for example, as gamma rays from the formations impinge upon or bombard the luminophor 30 as the instrument is passed through the hole and the measurement of the intensity of these gamma rays provides an indication of the nature of the formations traversed. When the gamma rays penetrate the luminophor scintillations or photons are produced therein, and these photons are detected by the photo-cathode 34, from which they are amplified in the form of electrical pulses corresponding in number to the scintillations produced. The pulses are further amplified by the device 24 and are recorded 26 usually on a moving tape which may, as is well known, be synchronized with the cable measuring device 22 so that the intensity recorded at any time will be correlated with the depth of the instrument at the bore hole at that time.

Shown below the luminophor container 28 is a suitable refrigerating or cooling and circulating device 38 having inlet and outlet conduits 40 and 42 connected with the upper end of the container 28. While the logging instrument is being passed through the bore hole, the luminophor 30 is cooled in the device 38 and circulated through the container 28 and in this manner, the tube 32 is cooled and maintained at a predetermined low temperature at which its thermal emission or background will be minimized. It will be seen that the luminophor 30 serves both as the substance in which the photons are produced by bombardment by the radiation from the formations and also as a cooling medium for the temperature sensitive photo-multiplier tube 32. With this arrangement, the logging instrument will not have to be opened at the surface before the log is run in order to pack the tube 32 in a material such as ice cubes which would, of course, have to be replaced each time a log is made.

There are several liquids which can be used as the luminophor-coolant and as an example of a particular material a solution of terphenyl in one of the following solvents is very satisfactory, the melting points of the solvents also being given.

| Solvent: | M. P. of solvent |
|---|---|
| Benzene | 5.5° C. |
| Phenylcyclohexane | 7.0° C. |
| Toluene | —95.1° C. |
| M-xylene | —53.6° C. |

If it is desired to refrigerate the scintillometer to a temperature of 0° C., one of the last two listed solvents should, of course, be the choice. If a higher temperature of say, 10° C. is sufficient for the conditions which are to be encountered, any of the four listed solvents would be satisfactory as coolants.

While the invention has been described as used in the measurement of gamma rays naturally emitted in the formations traversed by the bore hole, it is to be understood that other types of radioactivity logs can be made such, for example, as the neutron-gamma ray or induced gamma ray log. In this case a source of neutrons such as a mixture of radium and beryllium would be disposed within the housing 18 so that neutrons passing outwardly into the formations can induce gamma rays therein, some of which gamma rays will then be measured by the scintillometer. As is well-known, shielding should be used between the source of neutrons and the luminophor so as to prevent radiation from the source passing directly to the luminophor. In this case, the refrigerating device 38 could be placed in the upper portion of the housing 18 and the neutron source separated from the lower end of the container 28 by means of the shield.

Again, although the invention has been described as concerning a scintillometer to be used in measuring or detecting gamma rays, it is also to be understood that with a proper luminophor a scintillometer can be used to detect thermal neutrons while at the same time the liquid luminophor can serve as the coolant for the temperature sensitive portion of the device. Thus, by combining neutron sensitive elements such for example, as lithium, boron, or cadmium with a solution of terphenyl in one of the above mentioned solvents the luminophor will respond to thermal or slow neutrons and the action of the scintillometer will be similar to that previously described. Of course, most of the hydrogenous liquid luminophors will also detect fast neutrons without the addition of other elements but the detection of these fast neutrons is not considered to be of such importance as the detection of thermal neutrons, particularly in bore hole logging practice.

It is also to be understood that the invention is not to be limited to the use of a scintillometer in a well or bore hole since it is contemplated that the instrument can be used at or along the earth's surface or in mines, for measuring variations in the radiation emitted thereby.

Obviously many modifications and variations of the invention, as hereinbefore set forth may be made without departing from the spirit and scope thereof, and therefore only such limitations should be imposed as are indicated in the appended claims.

I claim:

1. A device for detecting penetrative radiation, comprising a quantity of fluid luminophor in which scintillations are produced on bombardment by said radiation, a photosensitive device disposed in proximity to said luminophor and means for cooling and circulating said luminophor past said photosensitive device, the arrangement being such that the luminophor serves both as the substance in which scintillations are produced and as a coolant for said photosensitive device.

2. An apparatus for measuring the intensity of penetrative radiation from earth formations, comprising an instrument housing, means for moving said housing along said formations, a fluid body in said housing in which body photons are produced upon bombardment by said radiation, a photosensitive device in said housing, means for cooling said photosensitive device comprising means for refrigerating and circulating said fluid past and in proximity to said photosensitive device so that said photosensitive device will be exposed to the fluid whereby the fluid also serves as a coolant for the photosensitive device, and means for recording the output of said photosensitive device in correlation to the position of said instrument housing with respect to said earth formations.

3. An apparatus as defined in claim 2 in which said housing is adapted to be moved through a bore hole traversing earth formations, the means for moving the housing including a conductor cable extending to the surface.

4. A device for detecting penetrative radiation, comprising a body of liquid luminophor in which scintillations are produced on bombardment by said radiation, a photocathode tube disposed in proximity to said luminophor and means for cooling and circulating said luminophor past said photocathode tube, the arrangement being such that the luminophor serves both as the body in which scintillations are produced and as a coolant for said photocathode tube.

5. A device as described in claim 4 in which the liquid luminophor is a solution of terphenyl in benzene.

6. A device as described in claim 4 in which the liquid luminophor is a solution of terphenyl in phenylcyclohexane.

7. A device as described in claim 4 in which the liquid luminophor is a solution of terphenyl in toluene.

8. A device as described in claim 4 in which the liquid luminophor is a solution of terphenyl in M-xylene.

9. An apparatus for measuring the intensity of penetrative radiation from earth formations traversed by a bore hole, comprising an instrument housing, means for moving said housing through said bore hole, a fluid body in said housing in which body photons are produced upon bombardment by said radiation, a photocathode tube in said housing, means for cooling said tube comprising means for refrigerating and circulating said fluid past and in proximity to said tube so that said tube will be exposed to the fluid whereby the fluid also serves as a cooling medium for the tube, and means for recording the output of said tube in correlation to the depth of said instrument housing in the bore hole.

10. In a method involving the detection of penetrative radiation, the improvement which comprises causing the radiation to impinge upon a liquid luminophor in which photons are thereby produced, in accordance with the intensity of said radiation, exposing a photosensitive device to said photons to produce electrical pulses, measuring the counting rate of said pulses, and refrigerating said photosensitive device by cooling and circulating said liquid luminophor past and in proximity to said photosensitive device.

11. The method of detecting gamma rays from formations traversed by a bore hole which comprises causing gamma rays entering the bore hole to impinge upon a liquid luminophor in which photons are thereby produced, exposing a photosensitive device to said photons to produce electrical pulses corresponding in number to said impinging gamma rays, recording the counting rate of said pulses as the measurements are made along the bore hole in co-relation to the depths of the measurements in the hole, and maintaining said photosensitive device at a predetermined low temperature by cooling and circulating said liquid luminophor as a cooling medium past and in proximity to said photosensitive device.

12. The method of detecting thermal neutrons from formations traversed by a bore hole which comprises causing the thermal neutrons entering the bore hole to impinge upon a liquid luminophor containing a neutron-reactive substance and in which photons are to be produced, exposing a photosensitive device to said photons to produce electrical pulses corresponding in number to said impinging neutrons, recording the counting rate of said pulses as the measurements are made along the bore hole in co-relation to the depths of the measurements in the hole, and maintaining said photosensitive device at a predetermined low temperature by cooling and circulating said liquid luminophor as a cooling medium past and in proximity to said photosensitive device.

References Cited in the file of this patent

UNITED STATES PATENTS

| | | |
|---|---|---|
| 2,351,028 | Fearon | June 13, 1944 |
| 2,433,554 | Herzog | Dec. 30, 1947 |
| 2,534,932 | Sun | Dec. 19, 1950 |
| 2,546,160 | Lengyel | Mar. 27, 1951 |

OTHER REFERENCES

Scintillation Counting with Solutions, by Hartmut Kallmann, Physical Review, vol. 78, 1950, pp. 621, 622.

Fluorescent Liquids for Scintillation Counters, by Hartmut Kallman and Milton Furst, from Nucleonics, March 1951, pp. 32 to 39.